(12) United States Patent
Nakagawa et al.

(10) Patent No.: US 8,052,336 B2
(45) Date of Patent: Nov. 8, 2011

(54) OPTICAL MODULE

(75) Inventors: Hiroshi Nakagawa, Osaka (JP); Takeshi Isoda, Yao (JP); Kosuke Sasada, Yao (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 12/614,370

(22) Filed: Nov. 6, 2009

(65) Prior Publication Data
US 2010/0129037 A1    May 27, 2010

(30) Foreign Application Priority Data

Nov. 21, 2008   (JP) ................... 2008-298200

(51) Int. Cl.
*G02B 6/36* (2006.01)
(52) U.S. Cl. ............... 385/92; 385/88; 385/90; 385/91; 385/94
(58) Field of Classification Search ............ 385/93
See application file for complete search history.

(56) References Cited

U.S. PATENT DOCUMENTS

| | | | |
|---|---|---|---|
| 5,617,495 A * | 4/1997 | Funabashi et al. | ............... 385/92 |
| 5,926,597 A | 7/1999 | Tagashira et al. | |
| 2006/0222310 A1 | 10/2006 | Watanabe | |

FOREIGN PATENT DOCUMENTS

| | | |
|---|---|---|
| JP | S56-047509 | 9/1979 |
| JP | H06-132675 | 5/1994 |
| JP | H09-318841 | 12/1997 |
| JP | 2000-056190 | 2/2000 |
| JP | 2000-121885 | 4/2000 |
| JP | 2002-072023 | 3/2002 |
| JP | 2005-091416 | 4/2005 |
| JP | 2006-284871 | 10/2006 |
| JP | 2008-051966 | 3/2008 |
| WO | WO 02/082150 | 10/2002 |
| WO | WO 2006/004864 | 1/2006 |

OTHER PUBLICATIONS

Extended European Search Report issued Feb. 1, 2010 for corresponding European patent application No. 09 014 360.3.
Office Action issued on Mar. 15, 2011 by the Japanese Patent Office for counterpart foreign patent application JP 2008-298200.

* cited by examiner

*Primary Examiner* — Uyen Chau N Le
*Assistant Examiner* — Chad Smith
(74) *Attorney, Agent, or Firm* — David N. Lathrop

(57) ABSTRACT

In an optical module including a module main body 10, an optical device housed in the module main body 10, and an optical fiber 21 having an end placed in the module main body 10 and optically coupled to the optical device, the end of the optical fiber 21 is held between a semi-cylindrical part 31*d* of a shield cover 31 that covers the module main body 10 and a semi-cylindrical part 32*c* of a presser plate 32.

8 Claims, 7 Drawing Sheets

OPTICAL MODULE

TECHNICAL FIELD

The present invention relates to an optical module that incorporates an optical device and holds an optical fiber optically coupled to the optical device at an end thereof.

BACKGROUND ART

An optical module serves as an electrical/optical interface between an optical fiber and an electronic circuit. Optical modules include light emitting modules, light receiving modules and light emitting/receiving modules. For example, a light emitting module incorporates a light emitting device, such as a laser diode (LD) and a light emitting diode (LED), and a light receiving module incorporates a light receiving device, such as a photo diode (PD).

In general, the light emitting module has a light emitting device and a driving IC that drives the light emitting device mounted on a substrate, and the light receiving module has a light receiving device and a pre-amplifier that amplifies the output signal from the light receiving device mounted on a substrate. It is common practice to provide the optical modules implemented in this way with a shield against electromagnetic waves (see Patent Document 1 (Japanese Patent Application Laid-Open No. 2000-56190) and Patent Document 2 (Japanese Patent Application Laid-Open No. 2000-121885), for example).

On the other hand, positioning and fixing of the end of the optical fiber is commonly achieved by positioning the optical fiber in a V-shaped groove formed in the substrate and fixing the optical fiber thereto by using an adhesive (see Patent Document 1 (Japanese Patent Application Laid-Open No. 2000-56190), for example).

According to an alternative method, an optical connector is attached to the end of the optical fiber, a ferrule corresponding to the ferrule of the optical connector in which the optical fiber is inserted and fixed is provided on the optical module, and the optical connector is connected to the ferrule of the optical module that holds the optical fiber on the side of the optical module (see Patent Document 2 (Japanese Patent Application Laid-Open No. 2000-121885), for example).

The optical modules of this type are finding increasing application, such as mobile devices. Thus, there are intense demands for simplification and thinning down of the structure and for price reduction.

DISCLOSURE OF THE INVENTION

In view of the circumstances described above, an object of the present invention is to provide an optical module that has a reduced thickness.

An optical module according to the present invention comprises:

a module main body having a body that has the outer shape of a rectangular parallelepiped and has a housing recess formed in an upper surface thereof to extend to a front surface thereof;

a shield cover having a rectangular upper plate that covers the module main body from above the housing recess and side plates that extend from opposite sides of the upper plate and are engaged with opposite side surfaces of the module main body;

an optical fiber having an end inserted into the housing recess;

an optical device housed in the module main body; and optical fiber fixing means that fixes the end of the optical fiber in the housing recess to the shield cover in such a manner that the end of the optical fiber is optically coupled to the optical device.

Effects of the Invention

According to the present invention, since the optical fiber fixing means fixes the end of the optical fiber to the shield cover in the housing recess of the module main body covered by the shield cover, the optical module has a smaller thickness than an optical module having a ferrule for holding and fixing the end of the optical fiber.

BEST MODES FOR CARRYING OUT THE INVENTION

Embodiments of the present invention will be described with reference to the drawings.

Figure 1:
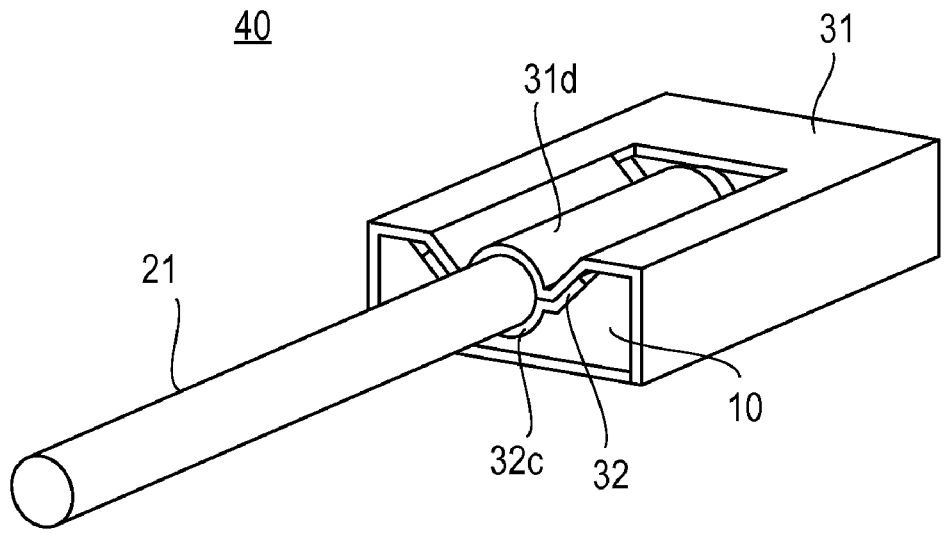
FIG. 1 is a perspective view of an optical module according to a first embodiment of the present invention.
Figure 2:
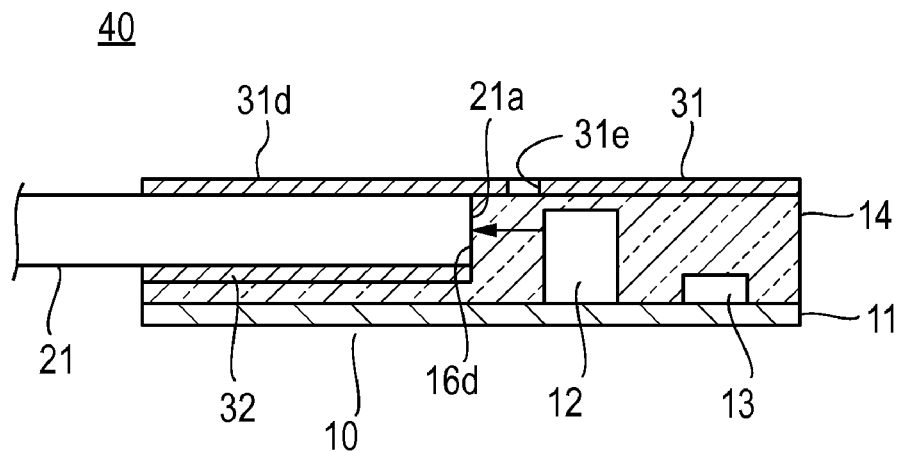
FIG. 2 is an enlarged cross-sectional view of the optical module shown in FIG. 1.
Figure 3:
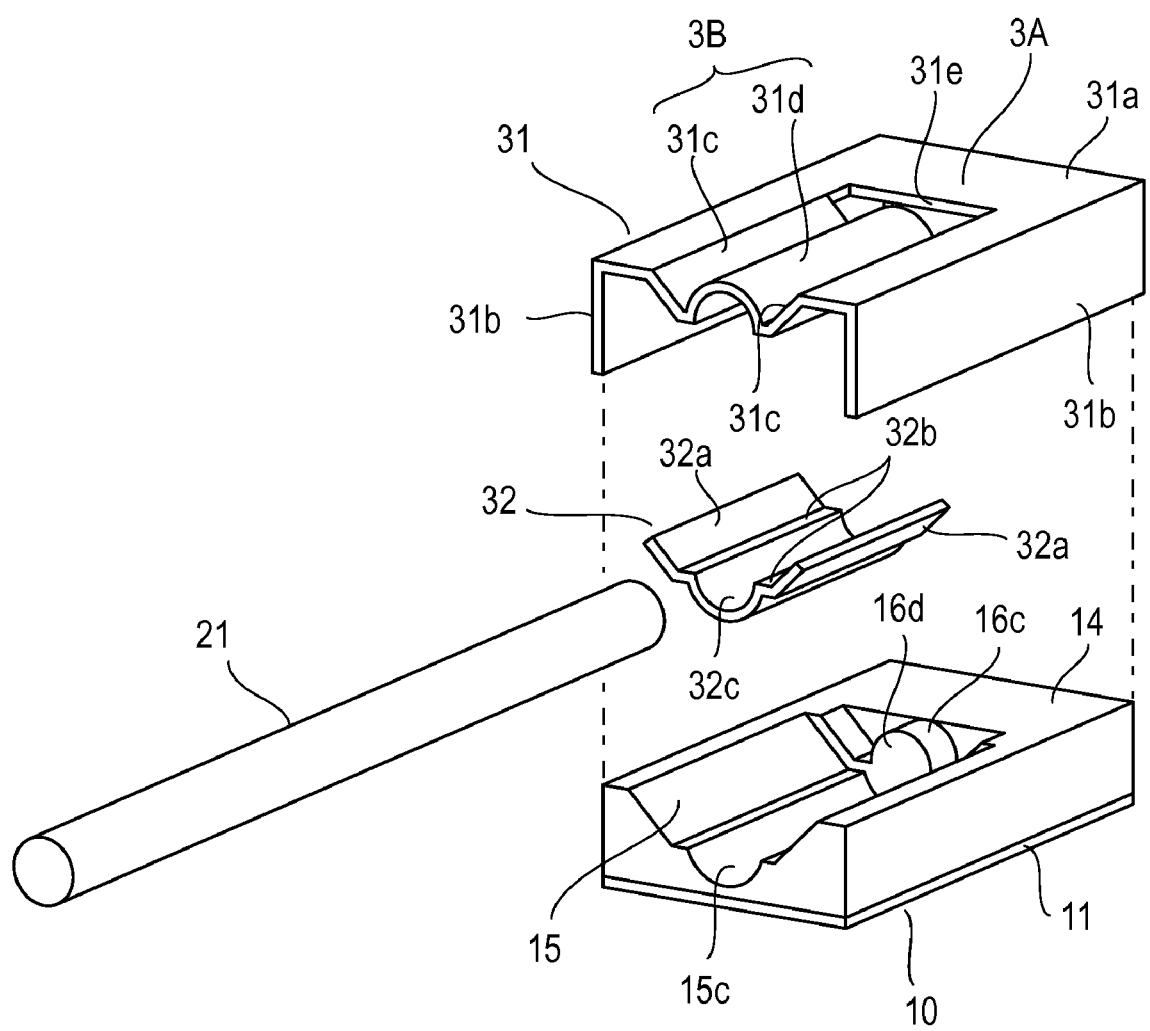
FIG. 3 is an exploded perspective view of the optical module shown in FIG. 1.

FIG. 1 shows an appearance of an optical module 40 according to an embodiment of the present invention, and FIG. 2 is a cross-sectional view of the optical module 40. FIG. 3 is an exploded view of the optical module 40. In this embodiment, the optical module 40 is a light emitting module and comprises a module main body 10, an optical fiber 21, a shield cover 31 and a presser plate 32.

As shown in FIG. 2, the module main body 10 comprises a substrate 11, a light emitting device 12, a driving IC 13 and a body 14. The light emitting device 12 is a laser diode (LD) or a light emitting diode (LED), for example. The light emitting device 12 and the driving IC 13 that drives the light emitting device 12 are mounted on the substrate 11.

The body 14 is made of a resin that is transparent to the light of the optical module 40. In this embodiment, the body 14 is formed on the substrate 11 by molding, and the light emitting device 12 and the driving IC 13 are buried and sealed in the body 14. The body 14 may be made of epoxy resin, polyimide resin, acrylic resin, or polycarbonate resin, for example.

Figure 4:
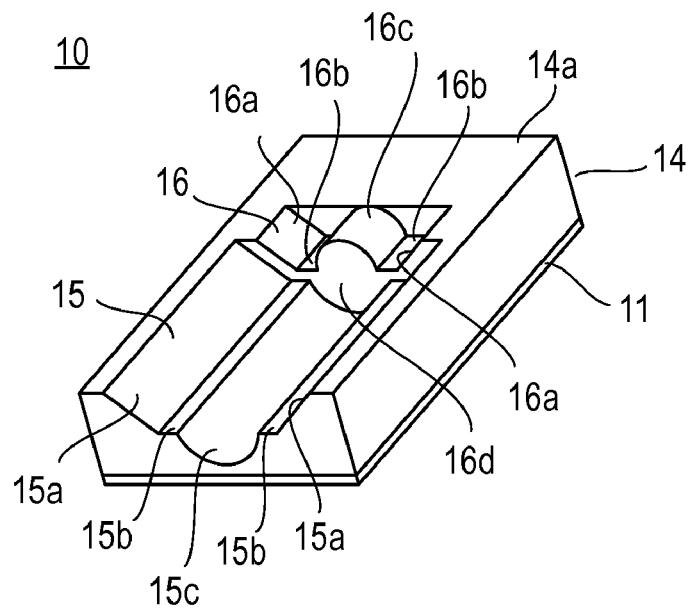
FIG. 4 is a perspective view of a module main body shown in FIG. 1.

As shown in FIG. 4, the outer shape of the body 14 is substantially a rectangular parallelepiped. The body 14 has a housing recess 15 having a substantially V-shaped cross section formed in an upper surface 14a thereof. The housing recess 15 extends in the axial direction of the body, which agrees with the axial direction of the optical fiber 21, and opens at a front end surface of the body 14. The housing recess 15 has a pair of inclined surfaces 15a that face each other and converge in the direction away from the upper surface 14a, a pair of step parts 15b connected to the inclined surfaces 15a, and a receiving groove 15c having a semi-circular cross section formed between the step parts 15b.

The body 14 further has a recess 16 formed adjacent to the rear end of the housing recess 15. The recess 16 has a pair of inclined surfaces 16a facing each other and declining from the upper surface 14a and a pair of step parts 16b connected to the inclined surfaces 16a. A positioning projection 16c having a semi-circular cross section having a radius equal to that of the optical fiber 21 in this embodiment is formed between the step parts 16b. A front end surface of the positioning projection 16c is seamlessly connected to the surface forming the rear end of the receiving groove 15c at the bottom thereof to form an optical coupling surface 16d having a substantially circular shape. The light emitting device 12 is positioned in the body 14 with the light emitting surface (light emitting part) thereof facing the optical coupling surface 16d.

As shown in FIG. 3, the shield cover 31 is formed by press-working an elastic metal plate and comprises a rectangular upper plate 31a and a pair of parallel side plates 31b that face each other and extend downwardly perpendicularly from two opposite sides of the upper plate. The upper plate 31a has a slit 31e formed in parallel with the rear edge thereof. In a rectangular region 3B defined by the slit 31e and straight lines drawn from the opposite ends of the slit 31e to the front edge of the upper plate 31a, a pair of inclined parts 31c declining from the two opposite sides of the rectangular region 3B and a semi-cylindrical part 31d that is convex upward and connected to the inclined parts 31c at the opposite side edges thereof are formed by press working. In other words, the upper plate 31a has a U-shaped frame region 3A that surrounds the rectangular region 3B, and the opposite side edges of the semi-cylindrical part 31d are connected to the opposite inner side edges of the U-shaped frame region 3A by the inclined parts 31c. The radius of the semi-cylindrical part 31d is approximately equal to the radius of the optical fiber 21, and the top of the convex surface is at the same level as or lower than the surface of the upper plate 31a.

The presser plate 32 is formed by press-working a rectangular metal plate and has a pair of attachment parts 32a extending downwardly from the two opposite sides of the presser plate 32 to approach each other to form a V shape, a pair of step parts 32b connected to the attachment parts 32a and a semi-cylindrical part 32c that is convex downward and connected to the step parts 32b at the opposite side edges thereof. The lower surface of the presser plate 32 is shaped to conform to the bottom surface of the housing recess 15 formed in the body 14.

Figure 5:
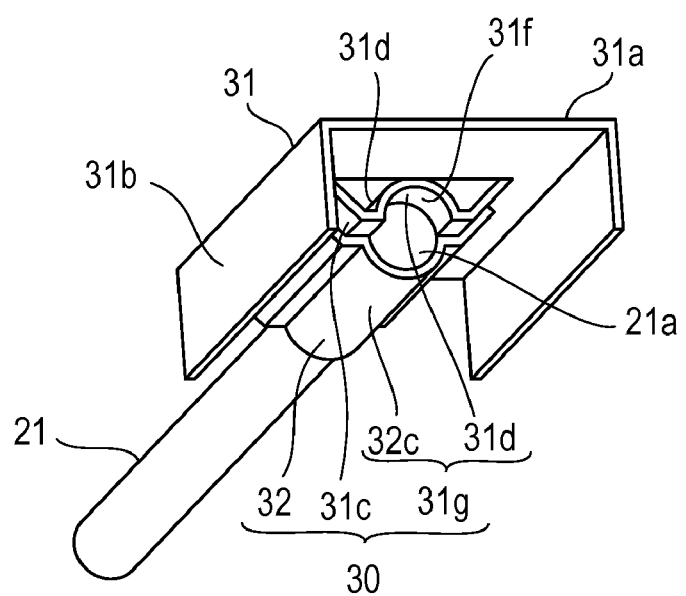
FIG. 5 is a perspective view of an optical fiber with one end held between a shield cover and a presser plate.

The radius of the semi-cylindrical part 32c is equal to the radius of the semi-cylindrical part 31d. In this embodiment, the end of the optical fiber 21 is held between the semi-cylindrical part 31d of the shield cover 31 and the semi-cylindrical part 32c of the presser plate 32. FIG. 5 shows the optical fiber 21 held in this way. The presser plate 32 is firmly fixed to the lower surface of the upper plate 31a of the shield cover 31 with the optical fiber 21 interposed therebetween. In other words, the inclined parts 31c, the semi-cylindrical part 31d and the presser plate 32 form optical fiber fixing means 30. In this state, the semi-cylindrical part 31d and the semi-cylindrical part 32c form a cylindrical part 31g. The presser plate 32 is fixed to the shield cover 31 by welding the attachment parts 32a to the inclined parts 31c, for example. The presser plate 32 may be fixed to the shield cover 31 by using an adhesive, for example, instead of welding.

The shield cover 31 is placed on the body 14 to house the optical fiber fixing means 30 holding the optical fiber 21 in the housing recess 15 formed in the body 14, whereby the presser plate 32 fits the bottom surface of the housing recess 15.

In this embodiment, the semi-cylindrical part 31d of the shield cover 31 is longer than the semi-cylindrical part 32c of the presser plate 32. As shown in FIG. 5, the rear end of the presser plate 32 does not project beyond an end face 21a of the optical fiber. On the other hand, the semi-cylindrical part 31d of the shield cover 31 projects beyond the end face 21a of the optical fiber 21. The projecting part forms a positioning recess 31f, and the shield cover 31 is positioned with respect to the body 14 by the positioning recess 31f being engaged with the positioning projection 16c on the body 14. In other words, the semi-cylindrical part 31d serves as a sleeve to align the optical fiber 21 with the positioning projection 16c so that the end face (optical coupling surface) 21a abuts against the optical coupling surface 16d on the body 14 as shown in FIG. 2. The elasticity of the inclined parts 31c supporting the semi-cylindrical part 31d allows positioning of the semi-cylindrical part 31d, or in other words, positioning of the optical fiber 21.

Attaching the shield cover 31 in this way to cover the module main body 10 completes the optical module. Although not shown in detail, the shield cover 31 can be fixed to the module main body 10 by engaging engagement projections formed on both side surfaces of the body 14 with engagement windows formed in the both side plates 31b of the shield cover 31, for example. Alternatively, the shield cover 31 can also be fixed to the module main body 10 by engaging an inwardly-projecting engagement claws formed on the both side plates 31b of the shield cover 31 with engagement recesses formed in the both side surfaces of the body 14, or by using an adhesive.

The optical module 40 configured as described above does not need the conventional cumbersome and complex process of positioning the end of the optical fiber in the V-groove formed in the substrate and fixing the optical fiber to the substrate by using an adhesive because the end of the optical fiber 21 is held between the shield cover 31 and the presser plate 32, and the end face 21a of the optical fiber 21 is aligned with the optical coupling surface 16d on the module main body 10 by engaging the positioning recess 31f of the shield cover 31 with the positioning projection 16c on the body 14 of the module main body 10.

Figure 6:
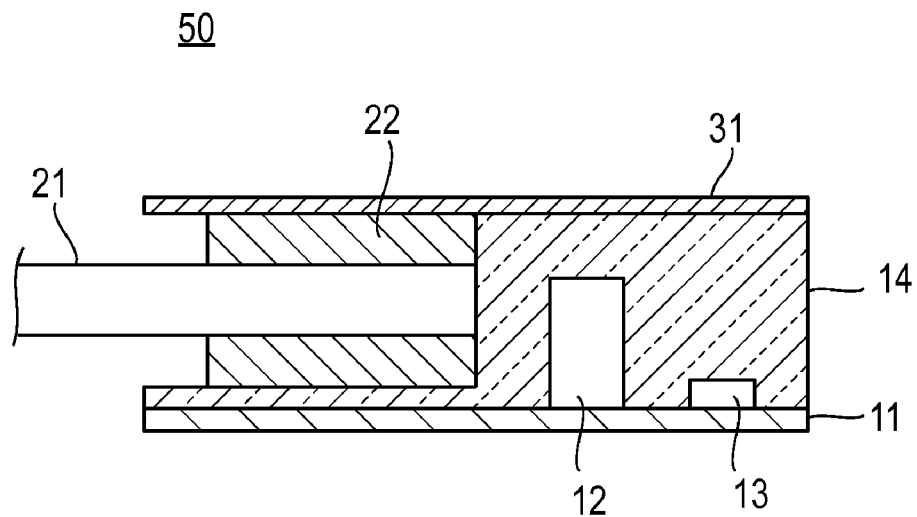
FIG. 6 is a cross-sectional view of a conventional optical module incorporating a ferrule.

Since the end of the optical fiber 21 is directly held between the shield cover 31 and the presser plate 32, a ferrule or sleeve as a separate component is not required, and the thickness of the optical module 40 can be reduced accordingly. More specifically, a conventional optical module 50 shown in FIG. 6 that has a ferrule 22 holding the end of the optical fiber 21 inserted therein has a greater thickness (height) than the optical module 40 according to the present invention shown in FIG. 2 because of the presence of the ferrule 22. According to the present invention, since the shield cover 31 is used also to hold the optical fiber 21, and the optical fiber 21 is held by the presser plate 32 and the shield cover 31, the thickness of the optical module can be reduced as shown in FIG. 2.

Figure 7:
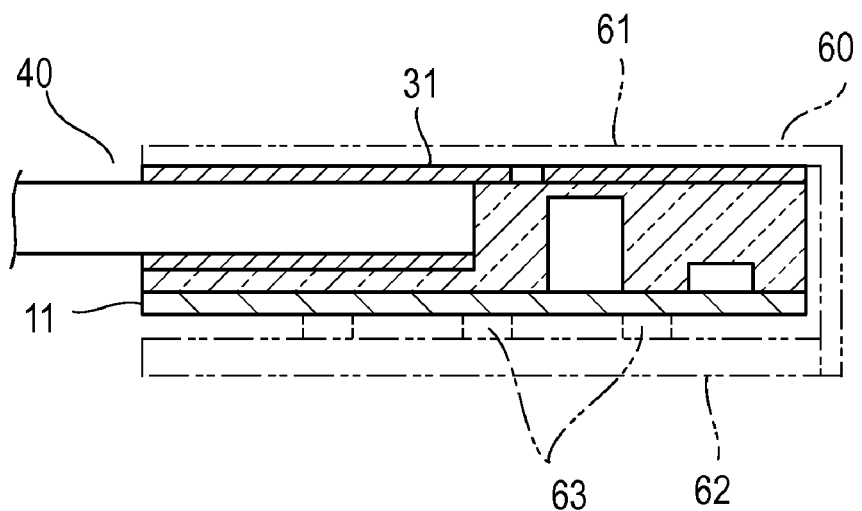
FIG. 7 is a diagram for illustrating the optical module shown in FIG. 1 fitted into a receptacle.

FIG. 7 shows the optical module 40 fitted into a receptacle 60. In FIG. 7, reference numeral 61 denotes a shield case of the receptacle 60, reference numeral 62 denotes a base made of a resin. Reference numeral 63 denotes a terminal formed on the base 62 by molding, and the terminal 63 is pressed against an electrode pattern (not shown) formed on the lower surface (the lower surface of the substrate 11) of the optical module 40.

When the optical module 40 is attached to the receptacle 60 as shown in FIG. 7, the shield cover 31 of the optical module 40 and the shield case 61 of the receptacle 60 forms a double electromagnetic shield structure. In particular, the shielding effect against electromagnetic waves at higher frequencies is improved.

Figure 8A:
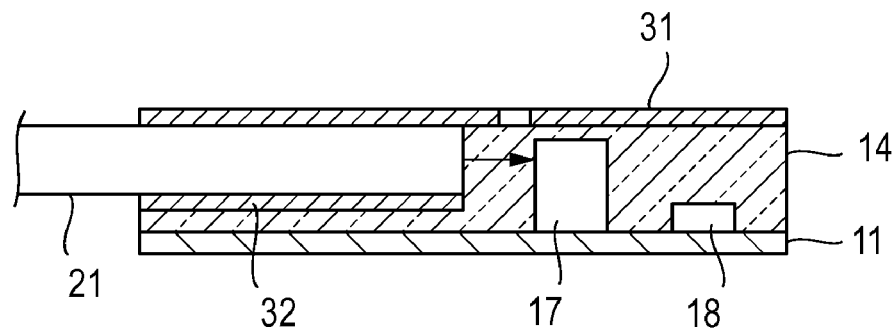
FIG. 8A is a cross-sectional view of a light receiving module incorporating a light receiving device according to a second embodiment.

Although the optical module 40 is a light emitting module in the embodiment described above, the optical module 40 may be a light receiving module 41 that comprises a light receiving device 17, such as a photo diode (PD), and an amplifier 18, such as a trans-impedance amplifier, mounted on the substrate 11 as shown in FIG. 8A.

Figure 8B:
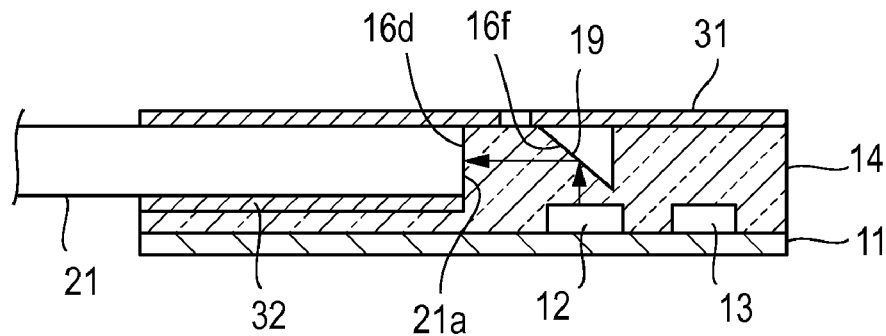
FIG. 8B is a cross-sectional view of an optical module according to a third embodiment of the present invention.

FIG. 8B shows a configuration of an optical module 42 that has a vertical cavity surface emitting laser (VCSEL) as the light emitting device 12. In this example, a triangular groove 19 is formed in the body 14 to provide an inclined surface 16$f$ that faces the optical coupling surface 16$d$ at an angle of 45 degrees to make the light emitted from the vertical cavity surface emitting laser 12 incident on the end face 21$a$ of the optical fiber 21 as shown by the arrows. The inclined surface 16$f$ reflects the light emitted from the light emitting device 12 to make the light incident on the end face 21$a$ of the optical fiber 21 through the optical coupling surface 16$d$. The light emitting device 12 shown in FIG. 8B may be replaced with a light receiving device 17 to form a light receiving module in which light exiting the optical fiber 21 is reflected by the inclined surface 16$f$ and is incident on the light receiving device 17.

Next, another embodiment of an optical module 43 will be described with reference to FIGS. 9 to 11.

In this embodiment, a shield cover 31' has a cylindrical part 31$g$, and the cylindrical part 31$g$ holds the end of the optical fiber 21. That is, the optical fiber 21 is held only by the shield cover 31' without using the presser plate 32.

Figure 11:
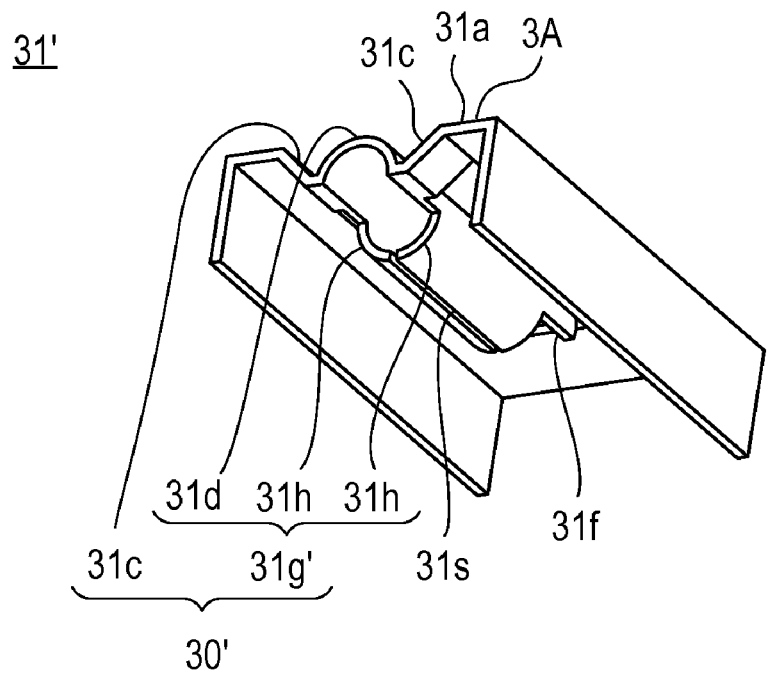
FIG. 11 is a perspective view of a shield cover of the optical module shown in FIG. 9.

Two quarter-cylindrical parts 31$h$ shown in FIG. 11 are formed by partially cutting the two inclined parts 31$c$ of the shield cover 31 shown in FIG. 3 along the boundary with the U-shaped frame region 3A by leaving front end parts of the inclined parts 31$c$ connected to the upper plate 31$a$, further cutting the inclined parts 31$c$ in the direction perpendicular to the boundary from the front ends of the cut lines to the semi-cylindrical part 31$d$, and bending the parts of the inclined parts 31$c$ cut away from the upper plate 31$a$. The two quarter-cylindrical parts 31$h$ and the semi-cylindrical part 31$d$ form a cylindrical part 31$g$'. The rear end of the semi-cylindrical part 31$d$ is coupled to an upper plate 31$a$ by a coupling part 31$m$ formed across the slit 31$e$. The inclined parts 31$c$, the semi-cylindrical part 31$d$ and the quarter-cylindrical parts 31$h$ form optical fiber fixing means 30'. In this embodiment, a slight gap 31$s$ for caulking is formed between the edges of the two quarter-cylindrical parts 31$h$ facing each other (along the centerline at the bottom of the cylindrical part 31$g$'). However, the gap 31$s$ may be omitted.

The semi-cylindrical part 31$d$ is connected to the upper plate 31$a$ by the pair of inclined parts 31$c$ at the opposite side edges of the front end thereof. On the other hand, the rear end part of the semi-cylindrical part 31$d$ projects beyond the cylindrical part 31$g$' to form a positioning recess 31$f$ as shown in FIG. 5 described above. The positioning recess 31$f$ is coupled to and supported by the bottom of the U-shaped frame region 3A of the upper plate 31$a$ by the coupling part 31$m$ at the middle of the top of the rear end of the positioning recess 31$f$. The coupling part 31$m$ has a width and a length that permit elastic deformation of the coupling part 31$m$ so that the position of the semi-cylindrical part 31$d$ can be adjusted.

Holding of the optical fiber 21 by the cylindrical part 31$g$' is achieved by inserting the end of the optical fiber 21 into the cylindrical part 31$g$' and caulking the gap between the quarter-cylindrical parts 31$h$. As with the shield cover 31 described above, the shield cover 31' holding the optical fiber 21 is mounted on and fixed to the body 14 and positioned by engaging the positioning recess 31$f$ with the positioning projection 16$c$ on the body 14.

Figure 9:
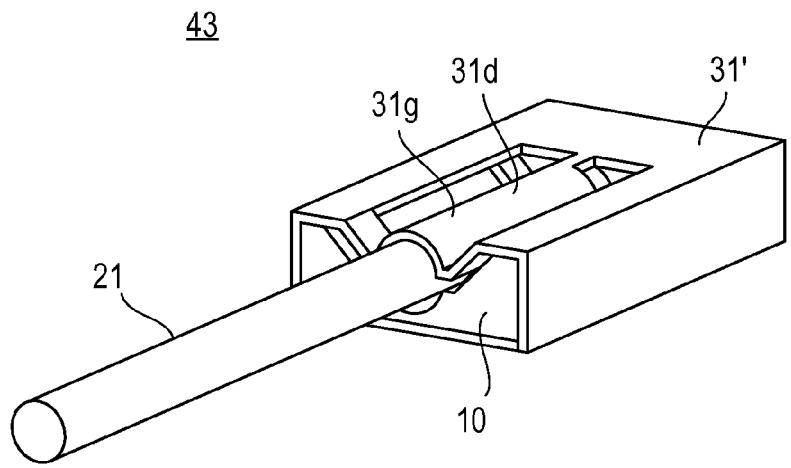
FIG. 9 is a perspective view of an optical module according to a fourth embodiment of the present invention.

For the optical module 43 shown in FIG. 9, since the presser plate 32 is omitted, the number of components is reduced compared with the optical module 40 shown in FIG. 1.

Figure 10:
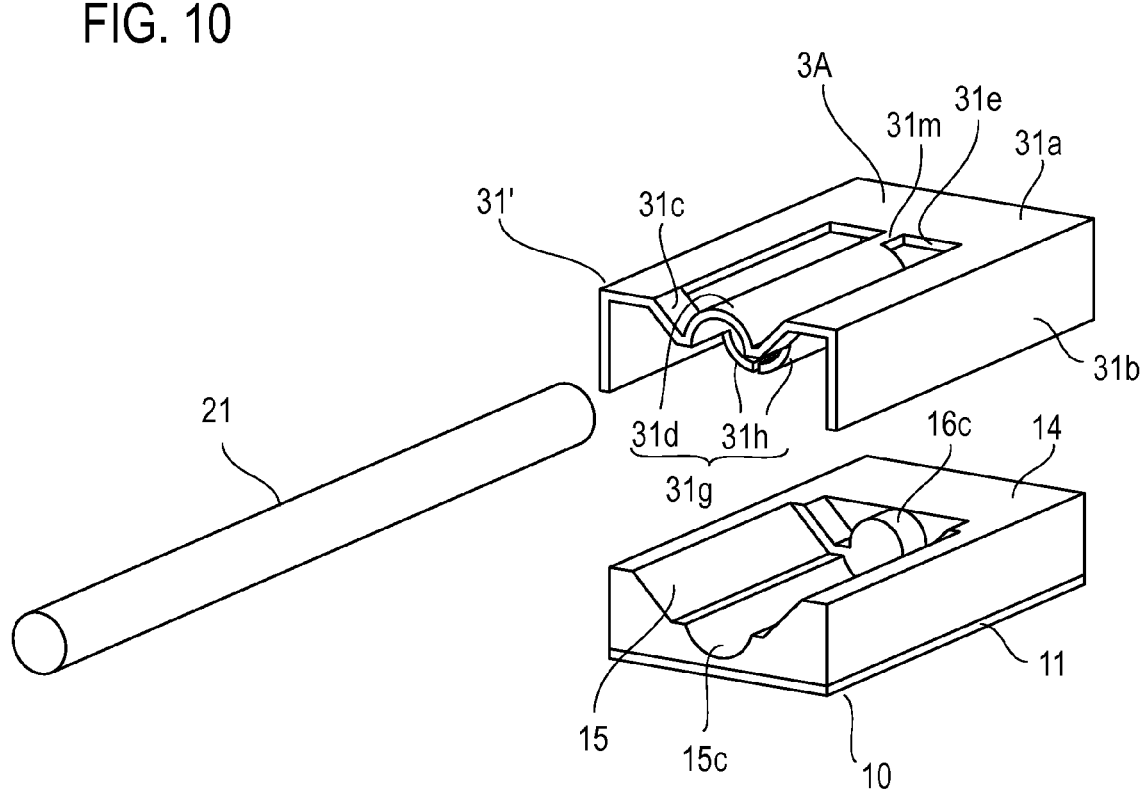
FIG. 10 is an exploded perspective view of the optical module shown in FIG. 9.
Figure 12:
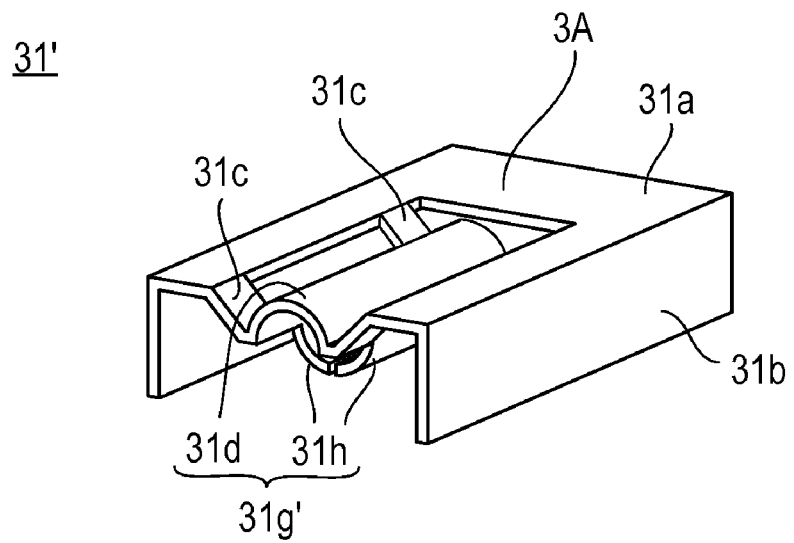
FIG. 12 is a perspective view of a modification of the shield cover.

In the embodiment shown in FIGS. 9 to 11, the part of each inclined part 31$c$ from the slit 31$e$ to a point close to the front end thereof is cut off, and the rear end of the semi-cylindrical part 31$d$ is coupled to the upper plate 31$a$ by the coupling part 31$m$. However, as shown in FIG. 12, according to a modification, the coupling part 31$m$ may be omitted, and the two quarter-cylindrical parts 31$h$ may be formed by cutting the pair of inclined parts 31$c$ from the upper plate 31$a$ by leaving a front end part thereof and a rear end part thereof connected to the upper plate 31$a$.

For example, for the optical module 40 shown in FIG. 1, the semi-cylindrical part 31$d$ of the shield cover 31 and the semi-cylindrical part 32$c$ of the presser plate 32 hold the optical fiber 21. For the optical module 43 shown in FIG. 9, the cylindrical part 31$g$ of the shield cover 31' holds the optical fiber 21. In this regard, the holding of the optical fiber 21 can be improved by roughening the inner surface of the semi-cylindrical parts 31$d$, 32$c$ and the cylindrical parts 31$g$, 31$g$' (the surface in contact with the optical fiber 21) by knurling or blasting, for example.

What is claimed is:
1. An optical module, comprising:
a module main body having a body that has the outer shape of a rectangular parallelepiped and has a housing recess formed in an upper surface thereof to extend to a front surface thereof;
an electromagnetic shield cover having a rectangular upper plate that covers the module main body from above the housing recess and side plates that extend from opposite sides of the upper plate and are engaged with opposite side surfaces of the module main body;
an optical fiber having a first end inserted into the housing recess and having a second end opposite the first end;
an optical device housed in the module main body, wherein the optical device is closer to the first end than the second end; and
optical fiber fixing means that fixes the first end of the optical fiber in the housing recess directly to the electromagnetic shield cover in such a manner that the first end of the optical fiber is optically coupled to the optical device, wherein the optical fiber fixing means comprises an upward-convex semi-cylindrical part; and
a positioning projection having an optical coupling surface to be coupled with an end face of the optical fiber is formed on the inner wall of the rear end of the housing recess, and the upward-convex semi-cylindrical part of the optical fiber fixing means projects beyond the end face of the optical fiber to form a positioning recess that is engaged with the positioning projection.

2. The optical module according to claim 1, wherein the upper plate of the shield cover has a U-shaped frame region that opens on the front side thereof and a rectangular region surrounded by the U-shaped frame region, the optical fiber fixing means comprises:
an upward-convex semi-cylindrical part that extends in the rectangular region in the longitudinal direction thereof;
two inclined parts that extend from opposite side edges of a front end part of the upward-convex semi-cylindrical part and are coupled to opposite inner side edges of the U-shaped frame region at an angle; and
two quarter-cylindrical parts that circumferentially extend from opposite side edges of a part of the upward-convex semi-cylindrical part on the rear side of the inclined parts and cooperate with the upward-convex semi-cylindrical part to form a cylindrical part that holds the optical fiber inserted therein;
wherein the optical module has a coupling part that couples the rear end of the upward-convex semi-cylindrical part to a bottom part of the U-shaped frame region.

3. An optical module comprising:
a module main body having a body that has the outer shape of a rectangular parallelepiped and has a housing recess formed in an upper surface thereof to extend to a front surface thereof;
an electromagnetic shield cover having a rectangular upper plate that covers the module main body from above the housing recess and side plates that extend from opposite sides of the upper plate and are engaged with opposite side surfaces of the module main body, wherein the upper plate of the shield cover has a U-shaped frame region that opens on the front side thereof and a rectangular region surrounded by the U-shaped frame region;
an optical fiber having a first end inserted into the housing recess and having a second end opposite the first end;
an optical device housed in the module main body, wherein the optical device is closer to the first end than the second end; and
optical fiber fixing means that fixes the first end of the optical fiber in the housing recess directly to the electromagnetic shield cover in such a manner that the first end of the optical fiber is optically coupled to the optical device, wherein the optical fiber fixing means comprises:
an upward-convex semi-cylindrical part that extends in the rectangular region in the longitudinal direction thereof;
four inclined parts that extend from opposite side edges of a front end part and a rear end part of the upward-convex semi-cylindrical part and are coupled to opposite inner side edges of the U-shaped frame region at an angle; and
two quarter-cylindrical parts that circumferentially extend from opposite side edges of a part of the upward-convex semi-cylindrical part between the inclined parts at the front end part and the inclined parts at the rear end part and cooperate with the upward-convex semi-cylindrical part to form a cylindrical part that holds the optical fiber inserted therein.

4. The optical module according to claim 3, wherein a positioning projection having an optical coupling surface to be coupled with an end face of the optical fiber is formed on the inner wall of the rear end of the housing recess, and the upward-convex semi-cylindrical part of the optical fiber fixing means projects beyond the end face of the optical fiber to form a positioning recess that is engaged with the positioning projection.

5. The optical module according to claim 2 or 4, wherein the body is molded from a light transmissive resin.

6. The optical module according to claim 5, wherein the optical device is buried in the body to face the optical coupling surface of the positioning projection.

7. The optical module according to claim 5, wherein a recess having an inclined surface that faces the optical coupling surface of the positioning projection at an angle of 45 degrees is formed in the upper surface of the body, and the optical device is buried in the bottom surface of the body to be optically coupled with the optical fiber via the inclined surface and the positioning projection.

8. The optical module according to claim 2 or 3, wherein the inner surface of the cylindrical part is subjected to a surface roughening treatment.

* * * * *